United States Patent
Matherly

[15] 3,696,127
[45] Oct. 3, 1972

[54] HIGH FILLER CONTENT SILICONE ELASTOMER WITH INCREASED EXTRUSION RATE

[72] Inventor: James E. Matherly, Elizabethtown, Ky.

[73] Assignee: Dow Corning Corporation, Midland, Mich.

[22] Filed: July 9, 1970

[21] Appl. No.: 53,694

[52] U.S. Cl................................260/375 B, 260/29.2 M
[51] Int. Cl....................................................C08k 1/06
[58] Field of Search............260/375 B, 378 B, 29.2 M

[56] References Cited

UNITED STATES PATENTS

| | | | |
|---|---|---|---|
| 3,065,194 | 11/1962 | Nitzsche | 260/46.5 G |
| 3,243,404 | 3/1966 | Martellock | 260/375 B |
| 3,161,614 | 12/1964 | Brown et al. | 260/375 B |
| 3,428,599 | 2/1969 | Newing | 260/375 B |
| 3,541,044 | 11/1970 | Beers et al. | 260/375 B |

Primary Examiner—Morris Liebman
Assistant Examiner—S. M. Person
Attorney—Robert F. Fleming, Jr., Laurence R. Hobey, Harry D. Dingman, Howard W. Hermann and Roger H. Borrousch

[57] ABSTRACT

A mixture of 100 parts by weight of a homogeneous mixture of 50 to 85 weight percent of an organodialkoxysiloxy endblocked polydiorganosiloxane, 10 to 35 weight percent hexamethyldisilazane, 4 to 30 weight percent water and 0 to 15 weight percent organotrialkoxysilane and from 125 to 250 parts by weight of a metal oxide filler, such as aluminum oxide is a silicone elastomer composition with increased extrusion rate after the volatile materials have been removed. Adding organotrialkoxysilane and organotitanate catalyst to the devolatized composition provides a one package silicone elastomer which is stable in the absence of moisture but curable upon exposure to moisture. The mixtures are prepared by mixing the polymer, hexamethyldisilazane, water and organotrialkoxysilane into a homogeneous mixture and thereafter adding the metal oxide filler and removing the volatiles under reduced pressure and adding organotrialkoxysilane and organotitanate catalyst to provide the silicone elastomer composition which is stable in the absence of moisture but curable upon exposure to moisture.

5 Claims, No Drawings

HIGH FILLER CONTENT SILICONE ELASTOMER WITH INCREASED EXTRUSION RATE

This invention relates to a silicone composition which has an increased extrusion rate and a method of preparing it.

Silicone compositions such as resins and rubbers are known to contain fillers to either provide useful properties or reduce their cost. Silicas are the most common filler used in silicone compositions. One property resulting from the addition of a filler to silicone compositions is the increase in viscosity or the stiffening of the resulting composition. This increase in viscosity or stiffening can be a useful property, except where the desired product is, for example, a room temperature vulcanizable silicone rubber and a flowable and pourable composition is desired. Thus, the skilled worker is in a dilemma. He can have a flowable composition or he can add small amounts of filler to gain some property advantages, but he loses the flowable property as he increases the filler loading in an attempt to gain more advantageous properties. Some silicone compositions are of a particularly viscous nature such that they are for the most part, not pourable but are sufficiently flowable to be extrudable. The present invention relates to this type of extrudable silicone composition.

It is, therefore, an object of the present invention to provide a silicone elastomer composition which has high filler content and increased extrusion rate compared to other high filler content silicone elastomer compositions. This object and others will become more apparent from the following detailed description.

This invention relates to a silicone elastomer composition consisting essentially of 100 parts by weight of a homogeneous mixture of 50 to 85 inclusive weight percent of an organodialkoxysiloxy endblocked polydiorganosiloxane where the organic radicals are selected from the group consisting of methyl, 3,3,3-trifluoropropyl and phenyl wherein at least 50 percent of the organic radicals are methyl radicals, the alkoxy radicals have from one to three inclusive carbon atoms per radical and said polydiorganosiloxane having a viscosity of from 2 to 500 poise at 25° C., from 10 to 35 inclusive weight percent hexamethyldisilazane, from 5 to 30 inclusive weight percent water and from 0 to 15 weight percent organotrialkoxysilane wherein the organic radical and the alkoxy radical are defined above, from 125 to 250 parts by weight of a finely divided metal oxide filler wherein the metal atom is selected from the group consisting of magnesium, zinc, aluminum, iron, titanium and zirconium, where the mixture has an extrusion rate at 25° C. of greater than 350 grams per minute as determined by Military Specification Number Mil-S-7502 after the removal of any volatile materials under reduced pressure of 10 to 20 mm of Hg at 100° C. for one hour.

The organodialkoxysiloxy endblocked polydiorganosiloxanes are well known in the art as described in U.S. Pat. No. 3,161,614 which is hereby incorporated by reference to show the preparation and specific polymers in greater detail. The organodialkoxysiloxy endblocked polydiorganosiloxanes of the present invention have viscosities from 2 to 500 poise at 25° C. and the organic radicals are methyl, 3,3,3-trifluoropropyl and phenyl wherein at least 50 percent of the organic radicals are methyl radicals. The alkoxy radicals can have from one to three carbon atoms per molecule and can be methoxy, ethoxy, n-propoxy and isopropoxy. Preferably, the organodialkoxysiloxy endblocked polydiorganosiloxane has a viscosity from 10 to 100 poise at 25° C. The polydiorganosiloxane is composed of diorganosiloxane units linked together by silicon-oxygen-silicon bonds. Illustrative of the diorganosiloxane units are dimethylsiloxane, methylphenylsiloxane, methyl-3,3,3-trifluoropropylsiloxane and diphenylsiloxane. The organodialkoxysiloxy endblocking units can be illustrated by methyldimethoxysiloxy, phenyldimethoxysiloxy, methyldiethoxysiloxy, phenyldi-n-propoxysiloxy, 3,3,3-trifluoropropyldimethoxysiloxy, methyldiisopropoxysiloxy and the like. Other organic radicals can be present in small amounts, such as less than 5 percent of the total number of organic radicals without departing from the present invention.

The organotrialkoxysilanes are well known in the art and can be illustrated by methyltrimethoxysilane, phenyltrimethoxysilane, 3,3,3-trifluoropropyltrimethoxysilane, methyltriethoxysilane, phenyltriethoxysilane, 3,3,3-trifluoropropyltriethoxysilane, methyltri-n-propoxysilane, methyltriisopropoxysilane, and the like.

The finely divided metal oxide fillers can be oxides of magnesium, zinc, aluminum, iron, titanium and zirconium. These metal oxide fillers are well known in the art and include magnesium oxide, zinc oxide, aluminum oxide, ferric oxide, titanium dioxide and zirconium oxide. Any of the finely divided forms of the metal oxides which are conventionally used as fillers are suitable for the present invention.

The mixture of the present invention is prepared by mixing the organodialkoxysiloxy endblocked polydiorganosiloxane, hexamethyldisilazane, water and organotrialkoxysilane if used to form a homogeneous mixture. The order of mixing is not critical, but preferably the ingredients are added to the polydiorganosiloxane. The mixture consists essentially of 50 to 85 inclusive weight percent of the organodialkoxysiloxy endblocked polydiorganosiloxane, 10 to 35 inclusive weight percent hexamethyldisilazane, 4 to 30 inclusive weight percent water and 0 to 15 inclusive weight percent organotrialkoxysilane, preferably from 2 to 10 weight percent organotrialkoxysilane. The ingredients are mixed until a homogeneous mixture is obtained. To 100 parts of this homogeneous mixture, from 125 to 250 parts by weight of the finely divided metal oxide filler is added. The metal oxide filler can be added either all at once or in increments. The resulting mixture is particularly useful as an intermediate in the preparation of one package silicone elastomer compositions which are stable in the absence of moisture but cure upon exposure to moisture. It is entirely unexpected that a silicone elastomer composition which is curable by exposure to moisture can be prepared by using large amounts of water. The volatile materials are removed prior to using the mixture in the preparation of the one package silicone elastomer composition. The volatile materials can be removed by heating under reduced pressure at temperatures up to about 175° C., preferably the volatile materials are removed by heating under reduced pressure of 10 to 20 mm of Hg at 100° C. for one hour. The extrusion rate of the mixture after heating under reduced pressure of 10 to 20 mm of Hg at 100° C. for one hour is greater than 350 grams per minute as determined by Military Specification Number Mil-S-7502, preferably from 400 to 700 grams per minute.

This devolatilized mixture can then be used to prepare the one package or one component silicone elastomer composition which is curable at room temperature by exposure to moisture but is stable when stored in the absence of moisture. To 100 parts by weight of the devolatilized metal oxide filler containing mixture, from 1 to 10 parts by weight of organotrialkoxysilane and from 0.1 to 5 parts by weight of an organotitanate catalyst is added. The resulting mixture is stable in the absence of moisture but cures to an elastomer when exposed to moisture at room temperature. The organotrialkoxysilane and organotitanate catalysts are mixed with the devolatilized mixture under conditions which are essentially free of moisture.

The organotitanate catalysts are well known in the art. The organotitanate catalyst can be organotitanium esters, beta-dicarbonyl titanium compounds, organosiloxy titanium compounds, titanium salts of carboxylic acids, partial hydrolyzates and the like. Some specific examples of organotitanate catalysts include tetraethyltitanate, tetraisopropyltitanate, tetra-n-butyltitanate, tetra-2-ethylhexyltitanate, tetraphenyltitanate, tetraoctadecyltitanate, triethanolaminetitanate, tetrakis-triethanolaminetitanate-N-stearate, ethyleneglycoltitanate, bis(acetylacetonyl)diisopropyltitanate, $[HOOC(CH_2)_4O]_2Ti(OH)_2$, $(CH_3COOCH_2O_4Ti$, diisopropyldiacetoxytitanate $(CH_3CH_2CH_2O)_3TiOTi(OCH_2CH_2CH_3)_3$, $Ti[OTi(OCH_2CH_2NHCH_2CH_2h_{-3}]_4$, $HO[(C_3H_7O)_2TiO]_{10}H$, $[(CH_3)_3SiO]_4Ti$, $[(CH_3)_3SiO]_2Ti[OCH(CH_3)_2]_2$, $(C_3H_7O)_3TiO[(CH_3)_2SiO]Ti(OC_3H_7)_3$ titanium naphthenate and

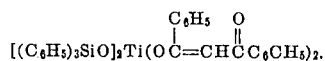

$[(C_6H_5)_3SiO]_3Ti(OC(C_6H_5)=CHCC_6H_5)_2$.

Additional details concerning to organotitanate catalyst can be found in U.S. Pats. Nos. 3,151,099, 3,294,739 and 3,334,067, which are hereby incroporated by reference to show the organotitanate catalyst.

The silicone elastomer compositions of the present invention are useful as sealants which have high extrusion rates, can be thermally conductive, are non-corrosive and have good electrical properties.

The following examples are illustrative only and should not be construed as limiting the present invention which is properly delineated in the claims. All parts are parts by weight unless otherwise stated.

EXAMPLE 1

The following ingredients were mixed to form a homogeneous mixture, 74.2 parts of a methyldimethoxysiloxy endblocked polydimethylsiloxane having a viscosity of 50 poise at 25° C., 8.6 parts of water and 17.2 parts of hexamethyldisilazane. To 100 parts of this homogeneous mixture 222.5 parts of aluminum oxide, $Al_2O_3$, and 8.6 parts of methyltrimethoxysilane was added. The resulting mixture was slowly heated to 100°C. under reduced pressure of 10 to 20 mm of Hg and the volatile materials were removed for 1 hour. The resulting mixture had an extrusion rate of 500 grams per minute as determined by Mil-S-7502. To 100 parts of this devolatilized mixture 3 parts of methyltrimethoxysilane, 0.5 part of a reinforcing silica filler and 0.75 part of tetrabutyltitanate was added. This mixture was stable when stored under anhydrous conditions, but cured when exposed to moisture. After allowing the catalyzed mixture to cure for 7 days at room temperature exposed to atmospheric moisture, it cured to a silicone elastomer having a durometer on the Short A scale of 70 as determined by ASTM-D-2240 procedure, a tensile strength at break of 300 p.s.i. and an elongation at break of 60 percent as determined by ASTM-D-412, Die C procedure, a thermal conductivity of $1.23 \times 10^3$ cal/sec/cm$^2$/cm/°C. as determined by the Cenco-Fitch procedure, a dielectric strength of 528 volts per mil as determined by ASTM-D-149 procedure, a volume resistivity of $4.9 \times 10^{13}$ ohm- centimeters and a surface resistivity of $2.8 \times 10^{15}$ ohms as determined by ASTM-D-257 procedure, a dielectric constant of 5.18 at $10^2$ Hertz and 4.93 at $10^5$ Hertz and a dissipation factor of 0.0271 at $10^2$ Hertz and 0.0087 at $10^5$ Hertz as determined by ASTM-D-150 procedure.

EXAMPLE 2

A homogeneous mixture of 56.6 parts of methyldimethoxysiloxy endblocked polydimethylsiloxane having a viscosity of 50 poise at 25°C., 26.4 parts of hexamethyldisilazane and 17.0 parts of water was prepared. To 100 parts of this homogeneous mixture, 170 parts of aluminum oxide was added. The resulting mixture had an extrusion rate greater than 350 grams per minute after slowly heating to 100°C. under a pressure of 10 to 20 mm of Hg and removing the volatile materials at these conditions for 1 hour. To 100 parts of the devolatilized mixture 3 parts of methyltrimethoxysilane and 0.75 part of tetrabutyltitanate were added. The resulting catalyzed mixture was allowed to cure by exposure to moisture at room temperature for 7 days and the resulting silicone elastomer had a durometer on the Short A scale of 73, a tensile strength at break of 390 p.s.i., an elongation of 80 percent, a thermal conductivity of $0.927 \times 10^3$ cal/sec/cm$^2$/cm/°C., a volume resistivity of $6.7 \times 10^{14}$ ohm- centimeters, a surface resistivity of $5.7 \times 10^{15}$ ohms, a dielectric strength of 578 volts per mil, a dielectric constant of 4.98 at $10^2$ Hertz and 4.78 at $10^5$ Hertz and a dissipation factor of 0.0198 at $10^2$ Hertz and 0.00845 at $10^5$ Hertz.

EXAMPLE 3

For comparative purposes, 74.2 parts of the methyldimethoxysiloxy endblocked polydimethylsiloxane of Example 1 was mixed with 222.5 parts of aluminum oxide by the procedure of Example 1. After removal of the volatile materials for one hour at 100° C. under a pressure of 10 to 20 mm of Hg, the resulting mixture had an extrusion rate of 148 grams per minute.

EXAMPLE 4

When zirconium oxide filler is substituted for aluminum oxide in Example 1, equivalent results are obtained.

EXAMPLE 5

The following compositions have extrusion rates in excess of 350 grams per minute when prepared by the procedure of Example 1:

A.
- 100 parts of a mixture of 85 parts of a diethoxymethylsiloxy endblocked polymethylphenylsiloxane having a viscosity of 2 poise at 25°C., 30 parts of hexamethyldisilazane, 30 parts of water and 15 parts of phenyltriethoxysilane and
- 250 parts of zinc oxide filer.

B.
- 100 parts of a mixture of 50 parts of a diisopropyl-3,3,3-trifluoropropylsiloxy endblocked polymethyl-3,3,3-trifluoropropylsiloxane having a viscosity of 500 poise, 20 parts of hexamethyldisilazane, 15 parts of water and 10 parts of 3,3,3-trifluoroporpyltrimethoxysilane and
- 125 parts of titanium dioxide filler.

C. 100 parts of a mixture of 60 parts of a dimethoxymethylsiloxy endblocked polydimethylsiloxane having a viscosity of 100 poise, 15 parts of hexamethyldisilazane, 20 parts of water and 5 parts of methyltrimethoxysilane, and
- 175 parts of magnesium oxide filler.

That which is claimed is:

1. A method for preparing an extrudable silicone elastomer composition comprising mixing from 50 to 85 inclusive weight percent of an organodialkoxysiloxy endblocked polydiorganosiloxane where the organic radicals are selected from the group consisting of methyl, 3, 3, 3-trifluoropropyl, and phenyl wherein at least 50 percent of the organic radicals are methyl radicals, the alkoxy radicals have from one to three inclusive carbon atoms per radical and said polydiorganosiloxane having a viscosity of from 2 to 500 poise at 25°C., from 10 to 35 inclusive weight percent hexamethyldisilazane, from 5 to 30 inclusive weight percent water and from 0 to 15 weight percent organotrialkoxysilane wherein the organic radical and the alkoxy radical are defined above, to form a homogeneous mixture, mixing with 100 parts by weight of the homogeneous mixture, from 125 to 250 parts by weight of a finely divided metal oxide filler wherein the metal oxide is selected from the group consisting of magnesium, zinc, aluminum, iron, titanium, and zirconium, and removing any volatile materials at reduced pressure at temperatures from ambient temperature to 175°C. inclusive whereby the resulting mixture has an extrusion rate of at least 350 grams per minute as determined by Military Specification Number Mil-S-7502.

2. A silicone elastomer composition prepared by the method of claim 1.

3. A method for preparing an extrudable silicone elastomer composition comprising mixing from 50 to 85 inclusive weight percent of an organodialkoxysiloxy endblocked polydiorganosiloxane where the organic radicals are selected from the group consisting of methyl, 3,3,3-trifluoropropyl and phenyl wherein at least 50 percent of the organic radicals are methyl radicals, the alkoxy radicals have from one to three inclusive carbon atoms per radical and said polydiorganosiloxane having a viscosity of from 2 to 500 poise at 25°C., from 10 to 35 inclusive weight percent hexamethyldisilazane, from 5 to 30 inclusive weight percent water and from 0 to 15 weight percent organotrialkoxysilane wherein the organic radical and the alkoxy radical are defined above, to form a homogeneous mixture, mixing with 100 parts by weight of the homogeneous mixture, from 125 to 250 parts by weight of a finely divided metal oxide filler wherein the metal oxide is selected from the group consisting of magnesium, zinc, aluminum, iron, titanium and zirconium, removing any volatile materials at reduced pressure at temperatures from ambient temperature to 175°C. inclusive whereby the resulting mixture has an extrusion rate of at least 350 grams per minute as determined by Military Specification Number Mil-S-7502, thereafter adding from 1 to 10 parts by weight of an organotrialkoxysilane where the organic radical and the alkoxy radical are defined above per 100 parts by weight of the devolatilized metal oxide filler containing mixture and from 0.1 to 5 inclusive parts by weight of an organotitanate catalyst based on 100 parts by weight of the devolatilized metal oxide filler containing mixture and storing the resulting composition under essentially moisture free conditions.

4. A silicone elastomer composition prepared by the method of claim 3.

5. The silicone elastomer composition in accordance with claim 4 in the cured state after being exposed to moisture.

* * * * *